US012700541B2

(12) United States Patent
    Kim et al.

(10) Patent No.: US 12,700,541 B2
(45) Date of Patent: Aug. 4, 2026

(54) DIELECTRIC FOR A CAPACITOR AND A METHOD OF MANUFACTURING SAME

(71) Applicants:HYUNDAI MOTOR COMPANY, Seoul (KR); KIA CORPORATION, Seoul (KR); KOREA INSTITUTE OF CERAMIC ENGINEERING AND TECHNOLOGY, Jinju-si (KR)

(72) Inventors: Hyungsuk Kim, Gwangmyeong-si (KR); Hyo Soon Shin, Jinju-si (KR); Dong Hun Yeo, Seoul (KR); Jeoung Sik Choi, Changwon-si (KR)

(73) Assignees: HYUNDAI MOTOR COMPANY, Seoul (KR); KIA CORPOATION, Seoul (KR); KOREA INSTITUTE OF CERAMIC ENGINEERING AND TECHNOLOGY, Jinju-si (KR)

( * ) Notice: Subject to any disclaimer, the term of this patent is extended or adjusted under 35 U.S.C. 154(b) by 1009 days.

(21) Appl. No.: 17/900,573

(22) Filed: Aug. 31, 2022

(65) Prior Publication Data

US 2023/0073053 A1       Mar. 9, 2023

(30) Foreign Application Priority Data

Sep. 3, 2021       (KR) ........................ 10-2021-0117296

(51) Int. Cl.
    *H01G 4/12*          (2006.01)
    *C04B 35/491*        (2006.01)
            (Continued)

(52) U.S. Cl.
    CPC ......... *H01G 4/1218* (2013.01); *C04B 35/491* (2013.01); *C04B 35/62695* (2013.01);
            (Continued)

(58) Field of Classification Search
    CPC ........... C04B 35/491; C04B 35/62695; H01G 4/1218
    See application file for complete search history.

(56) References Cited

U.S. PATENT DOCUMENTS

| | | | |
|---|---|---|---|
| 4,965,056 | A | 10/1990 | Chang |
| 5,066,617 | A | 11/1991 | Tanemoto et al. |

(Continued)

FOREIGN PATENT DOCUMENTS

| | | |
|---|---|---|
| JP | S62158117 A | 7/1987 |
| KR | 960001463 B1 | 1/1996 |
| KR | 101452077 B1 | 10/2014 |

OTHER PUBLICATIONS

Kamakshi et al. Effect of (Na and K) ion substitutions on the micro structural, dielectric and electrical properties of PZT Ceramics. Materials Today: Proceedings 2 (2015) 2896-2901. (Year: 2015).*

(Continued)

*Primary Examiner* — Erin Snelting
(74) *Attorney, Agent, or Firm* — Lempia Summerfield LLC

(57)       ABSTRACT

A method of manufacturing a dielectric for a capacitor and a dielectric for a capacitor manufactured thereby are provided. A dielectric for a capacitor is prepared by calcining a precursor mixture containing lead, lanthanum, zirconium, and titanium to produce calcined powder, adding additives including sodium, potassium, and the like to the powder, and sintering the mixture at a low temperature, whereby the dielectric has a high density and a large dielectric constant.

9 Claims, 4 Drawing Sheets

(51) Int. Cl.
    *C04B 35/626* (2006.01)
    *C04B 35/634* (2006.01)
    *C04B 35/64* (2006.01)

(52) U.S. Cl.
    CPC .......... *C04B 35/6342* (2013.01); *C04B 35/64*
        (2013.01); *C04B 2235/3227* (2013.01); *C04B*
            *2235/3234* (2013.01); *C04B 2235/3249*
        (2013.01); *C04B 2235/3296* (2013.01); *C04B*
            *2235/442* (2013.01); *C04B 2235/604*
        (2013.01); *C04B 2235/6567* (2013.01); *C04B*
            *2235/661* (2013.01); *C04B 2235/77* (2013.01)

(56)                  References Cited

U.S. PATENT DOCUMENTS 5,139,689  A      8/1992  Kitoh et al.
    5,607,632  A      3/1997  Neurgaonkar et al.

6,277,254  B1*    8/2001  Tan ..................... C23C 14/3414
                                                            428/697
 2008/0124885  A1*   5/2008  Lin ..................... H10B 12/033
                                                            438/386
 2014/0185183  A1     7/2014  Park et al.
 2016/0240318  A1     8/2016  Engel et al.
 2016/0380179  A1*   12/2016  Anil ................... C04B 35/6261
                                                            264/320

OTHER PUBLICATIONS

A. Kumar et al., Investigation of the Effects of Reduced Sintering
Temperature on Dielectric, Ferroelectric and Energy Storage Prop-
erties of Microwave-Sintered PLZT 8/60/40 Ceramics, Energies
2020, vol. 13, 6457; pp. 1-17.
S. Fu et al., Effects of doping pairs on the preparation and dielectric-
ity of PLZT ceramics, Ferroelectrics 1986, V. 67, Issue 1; pp.
93-102.

* cited by examiner

DIELECTRIC FOR A CAPACITOR AND A METHOD OF MANUFACTURING SAME

CROSS REFERENCE TO RELATED APPLICATION

The present application claims priority to Korean Patent Application No. 10-2021-0117296, filed Sep. 3, 2021, the entire contents of which are incorporated herein for all purposes by this reference.

BACKGROUND

1. Field of the Disclosure

The present disclosure relates to a method of manufacturing a dielectric for a capacitor, and a dielectric for a capacitor manufactured thereby. More particularly, the present disclosure relates to a dielectric for a capacitor, the dielectric being prepared by calcining a precursor mixture containing lead, lanthanum, zirconium, and titanium to produce calcined powder, adding additives including sodium, potassium, and the like to the powder, and sintering the mixture at a low temperature, whereby the dielectric has a high density and a large dielectric constant.

2. Description of the Related Art

A direct current (DC) link capacitor is included in an inverter for a traction motor of an electric vehicle. Typically, a capacitor applied to the inverter uses a polypropylene film or the like as an insulator, but in this case, there is a problem in that the capacitor is likely to malfunction at a high temperature because a polymer material is used as an insulator.

As a conventional solution to the above problem, a method of covering the film-type capacitor with a heat-blocking molding material was used. However, such a method posed a new problem of increasing the overall size and weight of the capacitor. Therefore, as another solution, barium titanate ($BaTiO_3$), which is a material having an outstanding dielectric constant, large capacitance, and excellent temperature characteristics, has been used. However, this material has a problem in that the dielectric constant thereof decreases at high voltage.

For this reason, there have been attempts to replace the barium titanate ($BaTiO_3$) with an anti-ferroelectric (AFE) material due to the advantages that the dielectric constant and capacitance increase with increasing operating voltage.

To this end, an AFE composition based on a material such as $Pb(La)(Zr, Ti)O_3$ containing lead, lanthanum, zirconium, and titanium is under intensive development.

Korean Patent No. 10-1452077 discloses a dielectric composition and a multilayer ceramic capacitor comprising the same. In the capacitor, a dielectric layer includes at least one second subcomponent selected from the group consisting of magnesium and aluminum, barium titanate, and barium zirconate titanate, in which the barium titanate and the barium zirconate titanate are contained in predetermined ratios to enable a highly reliable high-capacitance multilayer ceramic capacitor.

SUMMARY

An objective of the present disclosure is to provide a method of manufacturing a high-density dielectric for a capacitor through a low-temperature sintering process.

A second objective of the present disclosure is to provide a dielectric with a high dielectric constant for a capacitor.

A third objective of the present disclosure is to provide a dielectric for a capacitor that operates stably at high voltage and high temperature.

A fourth objective of the present disclosure is to provide a method of manufacturing, at high production yield, a dielectric for a capacitor that operates stably at high voltage and high temperature.

The objectives of the present disclosure are not limited to the objectives above. The objectives of the present disclosure should be more clearly understood from the following detailed description and be realized by the methods stated in the claims and combinations thereof.

According to one aspect of the present disclosure, a method of manufacturing a dielectric for a capacitor is provided. The method includes: mixing precursors for a dielectric to prepare a precursor mixture; calcining the precursor mixture to produce a calcined product; pressing the calcined product to produce a molded product; and sintering the molded product to produce a sintered product. After the calcining, a step of adding an additive to the calcined product may be performed. The additive may include sodium, potassium, or both.

The precursors for the dielectric may include lead oxide (PbO), lanthanum oxide ($La_2O_5$), zirconium oxide ($ZrO_2$), and titanium oxide ($TiO_2$).

The precursors for the dielectric may include 50 to 65 wt % of lead oxide (PbO), 4 to 8 wt % of lanthanum oxide ($La_2O_5$), 25 to 40 wt % of zirconium oxide ($ZrO_2$), and 2 to 6 wt % of titanium oxide ($TiO_2$).

The calcining of the precursor mixture may be carried out for 2 to 5 hours at 700° C. to 900° C.

In the sintering step, the sintering may be carried out for 2 to 5 hours at 900° C. to 1000° C.

The additive may be added in an amount of 0.5 to 1.5 parts by weight per 100 parts by weight of the calcined product.

The additive may include any one compound selected from the group comprising or consisting of sodium carbonate ($Na_2CO_3$), potassium carbonate ($K_2CO_3$), and a combination thereof.

The additive may include sodium and potassium in a weight ratio of 4:1 to 4.5:0.5.

The method may further include drying at a temperature in a range of 80° C. to 120° C. after the calcining or the adding of the additive.

The method may further include mixing the calcined product, a binder, and a solvent and granulating the resulting mixture after the adding of the additive.

The dielectric may include lead (Pb), lanthanum (La), zirconium (Zr), titanium (Ti), sodium (Na), and potassium (K).

The dielectric may have a dielectric constant ($\varepsilon$) of 800 or higher.

The molar ratio of lead, lanthanum, zirconium, titanium, sodium, and potassium included in the dielectric may be one of 0.85 to 0.9:0.1 to 0.15:0.85 to 0.95:0.05 to 0.15:0.08 to 0.15:0.01 to 0.05.

The dielectric may have a density of 7.5 $g/cm^3$ or higher.

According to another aspect of the present disclosure, a capacitor is provided that includes the dielectric and electrodes disposed on the respective surfaces of the dielectric. The electrodes include copper (Cu).

The present disclosure may provide a method of manufacturing a high-density dielectric for a capacitor by using a low-temperature sintering process.

The present disclosure may provide a high-dielectric constant dielectric for a capacitor.

The present disclosure may provide a dielectric for a capacitor that can operate stably at high voltage and high temperature.

The present disclosure may provide a method of manufacturing, at high production yield, a dielectric for a capacitor that can operate stably at high voltage and high temperature.

The effects of the present disclosure are not limited to the effects described above. The effects of the present disclosure should be understood to include all of the effects which may be deduced from the description below.

DETAILED DESCRIPTION

Figure 1:
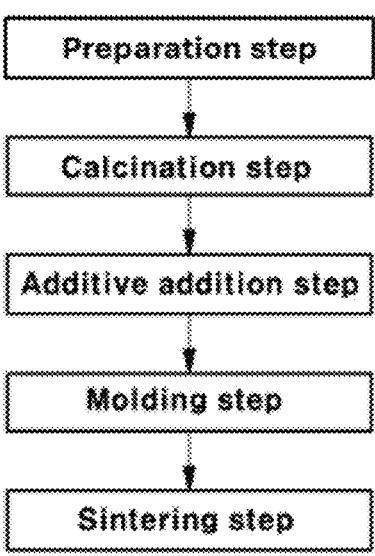
FIG. 1 is a flowchart for a method of manufacturing a dielectric for a capacitor according to one embodiment of the present disclosure.

The above and other objectives, features, and other advantages of the present disclosure should be more clearly understood from the following description of the embodiments taken in conjunction with the accompanying drawings. However, the present disclosure is not limited to the embodiments described herein and may be embodied in other forms. Rather, these embodiments are provided so that this disclosure is thorough and complete, and fully conveys the scope of the disclosure to one having ordinary skill in the art.

Reference should be made to the drawings, in which the same reference numerals are used throughout the different drawings to designate the same or similar elements. In the accompanying drawings, the dimensions of the structures have been enlarged compared to the actual size for clarity of the present disclosure. Although terms such as first and second may be used to describe various elements, the elements should not be limited by the terms. The terms are used solely for the purpose of distinguishing one element from another element. For example, without departing from the scope of the present disclosure, a first element may be named a second element, and similarly, a second element may be named a first element. Unless the context clearly indicates otherwise, the singular form also includes the plural forms.

The terms "include", "have", and the like when used herein should be understood to specify the presence of stated features, numbers, steps, operations, elements, components, or combinations thereof. Such terms do not preclude the presence or addition of one or more other features, numbers, steps, operations, elements, components, or combinations thereof. In addition, when a part of a layer, film, region, plate, etc. is said to be "on" another part, this includes the case where the other part is "directly on" and also includes the case where there is another part in between. Conversely, when a part of a layer, film, region, plate, etc. is said to be "under" another part, cases are included where it is "directly under" another part and also where there is another part in between.

Unless otherwise specified, all numbers, values, and/or expressions expressing quantities of ingredients, reaction conditions, polymer compositions and formulations used herein should be understood to be modified by the term "about" as these numbers approximations reflecting the various uncertainties of measurements that occur in obtaining those values among others. In addition, where a numerical range is set forth herein, such a range is continuous and includes all values from the minimum value of said range to the maximum value thereof inclusive of the maximum value, unless otherwise indicated. Furthermore, where such a range refers to integers, all integers from the minimum value to the maximum value inclusive of the maximum value are included unless otherwise indicated.

In the present specification, where a range is stated for a variable, the variable should be understood to include all values within the stated range inclusive of the stated endpoints of the range. For example, a range of "5 to 10" should be understood to include not only the values 5, 6, 7, 8, 9, and 10, but also any subranges such as 6 to 10, 7 to 10, 6 to 9, and 7 to 9. Any value between valid integers within the scope of the stated range, such as 5.5, 6.5, 7.5, 5.5 to 8.5, and 6.5 should also be included. In addition, for example, a range of "10% to 30%" includes values such as 10%, 11%, 12%, and 13%; all integers up to and including 30%; any subrange such as 10% to 15%, 12% to 18%, and 20% to 30%; and any value between valid integers within the scope of the stated range, such as 10.5%, 15.5%, and 25.5%.

The present disclosure relates to a method of manufacturing a dielectric for a capacitor, a dielectric for a capacitor manufactured by the method, and a capacitor including the dielectric.

Hereinafter, each process included in the method of manufacturing a dielectric for a capacitor is described, and the dielectric for a capacitor and the like manufactured thereby is described through embodiments and the like.

Method of Manufacturing a Dielectric for a Capacitor

The method of manufacturing a dielectric for a capacitor of the present disclosure includes: mixing precursors for a dielectric to prepare a precursor mixture; calcining the precursor mixture to produce a calcined product; adding an additive to the calcined product; pressing the calcined product to produce a molded product; and sintering the molded product to produce a sintered product.

FIG. 1 is a flowchart for a method of manufacturing a dielectric for a capacitor according to one embodiment of the present disclosure. Each step of the process is described with reference to FIG. 1.

Preparation Step

This is a step of mixing precursors for a dielectric to prepare a precursor mixture. The precursors for the dielectric are mixed and synthesized to provide elements which may constitute the dielectric framework according to one embodiment of the present disclosure, particularly elements such as lead, lanthanum, zirconium, titanium, and the like. In one example, the precursors for the dielectric include lead oxide (PbO), lanthanum oxide ($La_2O_5$), zirconium oxide ($ZrO_2$), and titanium oxide ($TiO_2$).

In another example, the precursors for the dielectric include 50 to 65 wt % of lead oxide (PbO), 4 to 8 wt % of lanthanum oxide ($La_2O_5$), 25 to 40 wt % of zirconium oxide ($ZrO_2$), and 2 to 6 wt % of titanium oxide ($TiO_2$). When the contents are outside the ranges provided above, a dielectric with an optimal molar ratio of lead, lanthanum, zirconium, and titanium is difficult to obtain or cannot be obtained.

In the present disclosure, the dispersion effect of the precursors may be maximized by using a dispersing agent and the like as desired and drying may be performed at 80° C. to 120° C. after mixing.

Calcination Step

This is a step of calcining the precursor mixture to produce a calcined product. Particularly, a step is provided of preparing a molded product with the precursor mixture and performing heat treatment before sintering.

The calcining is, in one example, carried out at a temperature in a range of 700° C. to 900° C. and is carried out for 2 to 5 hours.

After the calcining, a pulverization process may be added if desired to form a powder of even-sized particles.

Additive Addition Step

This is a step of adding an additive to the calcined product before sintering.

The additive has the purpose of increasing the dielectric constant of the dielectric according to one embodiment of the present disclosure but is added for the purpose of lowering the sintering temperature during sintering.

The additive may include sodium, potassium, or both. The potassium has a large effect of increasing the dielectric constant and the sodium has a large effect of lowering the sintering temperature. The additive, in one example, includes any one compound selected from the group comprising or consisting of sodium carbonate ($Na_2CO_3$), potassium carbonate ($K_2CO_3$), and a combination thereof.

The additive, in another example, includes sodium carbonate ($Na_2CO_3$) and potassium carbonate ($K_2CO_3$).

In the present disclosure, the additive is added in an amount of 0.5 to 1.5 parts by weight per 100 parts by weight of the calcined product. Where the amount of the additive is less than 0.5 parts by weight, the effects of increasing the dielectric constant and reducing the sintering temperature is difficult to obtain or cannot be obtained. Where the amount of the additive exceeds 1.5 parts by weight, efficiency is reduced and more substitution reactions than desired are performed, so that a dielectric with the desired structure is difficult to obtain or cannot be obtained.

The additive is, in one example, included so that the weight ratio of sodium to potassium is 4:1 to 4.5:0.5. Where the weight ratio is outside the range of weight ratios provided above, the desired effect of increasing the dielectric constant is difficult to obtain or cannot be obtained, or the effect of reducing the sintering temperature is difficult to obtain or cannot be obtained.

If desired, the calcined product mixed with the additive may be further pulverized, and may be dried at 80° C. to 120° C.

Molding Step

This is a step of preparing a molded product by pressing the calcined product. The calcined product may be granulated before molding, mixing the calcined product, a binder, and a solvent, and granulating the resulting mixture.

The granulated calcined product may be molded into a desired shape, for example, by pressing.

When the binder and the solvent are used, a binder removal process may be further performed to remove the binder and the solvent. The binder removal process may be performed through heat treatment at a temperature in a range of 500° C. to 700° C. By the heat treatment, the binder and the solvent as well as the carbon contained in the additive may also be removed.

6

Sintering Step

Sintering may be performed for the purpose of making the calcined product and powder particles of the additive constituting the molded product adhere to each other and harden.

The sintering temperature can be lowered by adding an additive containing sodium. In one example, the sintering process is performed for 2 to 5 hours at a temperature of 900° C. to 1000° C. In contrast to the sintering temperature of a dielectric manufacturing process generally being 1300° C. or higher, the sintering of the present disclosure is carried out at a relatively low temperature.

Dielectric for Capacitor

The dielectric of manufactured by the method manufacturing a dielectric for a capacitor according to one embodiment of the present disclosure includes lead (Pb), lanthanum (La), zirconium (Zr), titanium (Ti), sodium (Na), and potassium (K).

The molar ratio of lead, lanthanum, zirconium, titanium, sodium, and potassium included in the dielectric is, in one example, in a range of 0.85-0.9:0.1-0.15:0.85-0.95:0.05-0.15:0.08-0.15:0.01-0.05.

The dielectric, in one example, has a dielectric constant (ε) of 800 or higher and has a density of 7.5 $g/cm^3$ or higher.

Capacitor

A capacitor of according to an embodiment of the present disclosure includes a dielectric for the capacitor of the present disclosure and electrodes provided on the respective surfaces of the dielectric.

The electrodes include copper (Cu).

Hereinafter, the present disclosure is described in more detail through specific examples. However, these examples are for illustrating the present disclosure, and the scope of the present disclosure is not limited thereto.

Manufacturing Example

A mixture was prepared by mixing PbO, $La_2O_5$, $ZrO_2$, and $TiO_2$ together with ethanol and a dispersant (BYK-111) through a ball milling process at 120 RPM for 24 hours. The mixture was dried in an oven at 100° C. for 24 hours, heated to 880° C. by raising the temperature 5° C. per minute, and then calcined for 3 hours and 30 minutes to obtain a calcined product. Thereafter, a pulverization process was performed for induction, $Na_2CO_3$ (AMOTECH) and $K_2CO_3$ (Daejung Chemicals & Metals) powders were added, and then pulverization and mixing with ethanol was performed for 48 hours at 120 RPM. After the pulverization was finished, drying was performed in an oven at 100° C. for 24 hours, and then granulation was carried out by mixing with an aqueous polyvinyl butyral (PVB) binder. A coin-shaped molded product prepared using the granulated powder using a uniaxial press. Then, the temperature was raised at 5° C. per minute to 600° C. and maintained for 2 hours, followed by a binder removal process. Thereafter, the temperature was raised at 5° C. per minute to 950° C. and while maintaining the temperature for 3 hours, sintering was performed to prepare a sintered body. After the sintering was completed, both surfaces of the molded product were polished, and Cu was applied to form an electrode.

Example 1-3 and Comparative Examples 1-7

The dielectrics of the examples and comparative examples were manufactured by the method of the manufacturing example above and the molar ratio of each respective dielectric manufactured is provided in Table 1.

TABLE 1

| category | Pb | La | Zr | Ti | Na | K |
|---|---|---|---|---|---|---|
| Example1 | 0.88 | 0.12 | 0.86 | 0.14 | 0.1 | 0.01 |
| Example2 | 0.88 | 0.12 | 0.86 | 0.14 | 0.1 | 0.02 |
| Example3 | 0.88 | 0.12 | 0.86 | 0.14 | 0.1 | 0.03 |
| Comparative Example1 | 0.88 | 0.12 | 0.86 | 0.14 | 0.1 | 0.07 |
| Comparative Example2 | 0.88 | 0.12 | 0.86 | 0.14 | 0.02 | 0.02 |
| Comparative Example3 | 0.88 | 0.12 | 0.86 | 0.14 | 0.03 | 0.02 |
| Comparative Example4 | 0.88 | 0.12 | 0.86 | 0.14 | 0.04 | 0.02 |
| Comparative Example5 | 0.88 | 0.12 | 0.86 | 0.14 | 0.05 | 0.02 |
| Comparative Example6 | 0.88 | 0.12 | 0.86 | 0.14 | 0.06 | 0.20 |
| Comparative Example7 | 0.88 | 0.12 | 0.86 | 0.14 | 0.20 | 0.02 |

Comparative Example 8

A dielectric was manufactured in the same manner as in the Manufacturing Example except that no additives were used.

Comparative Example 9

A dielectric was manufactured in the same manner as in the Manufacturing Example except that additives were added before calcining the mixture.

Experimental Example

Figure 2:
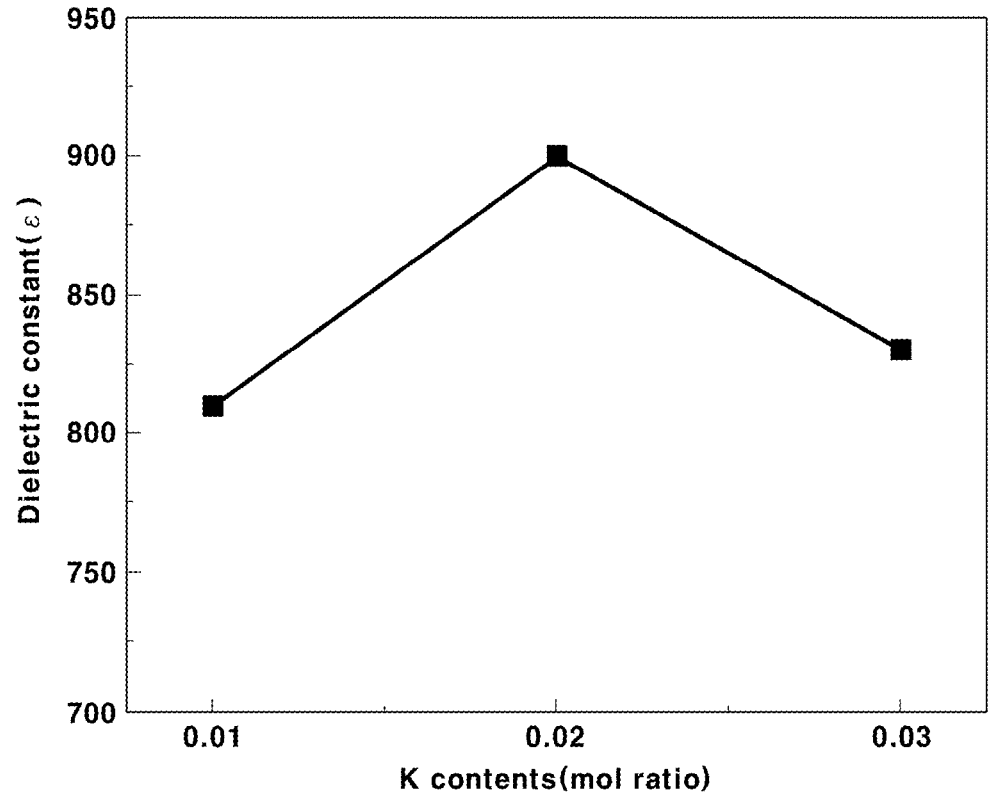
FIG. 2 shows change in dielectric constant according to change in the content of potassium in an additive.
Figure 3:
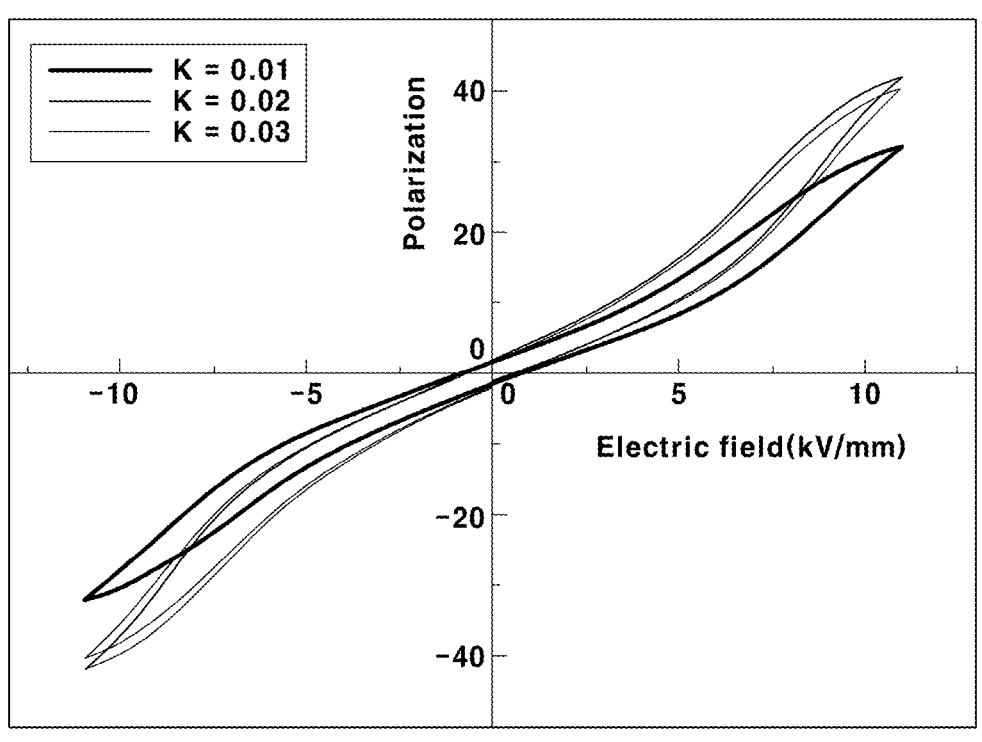
FIG. 3 shows change in polarization value according to change in the content of potassium in the additive.
Figure 4:
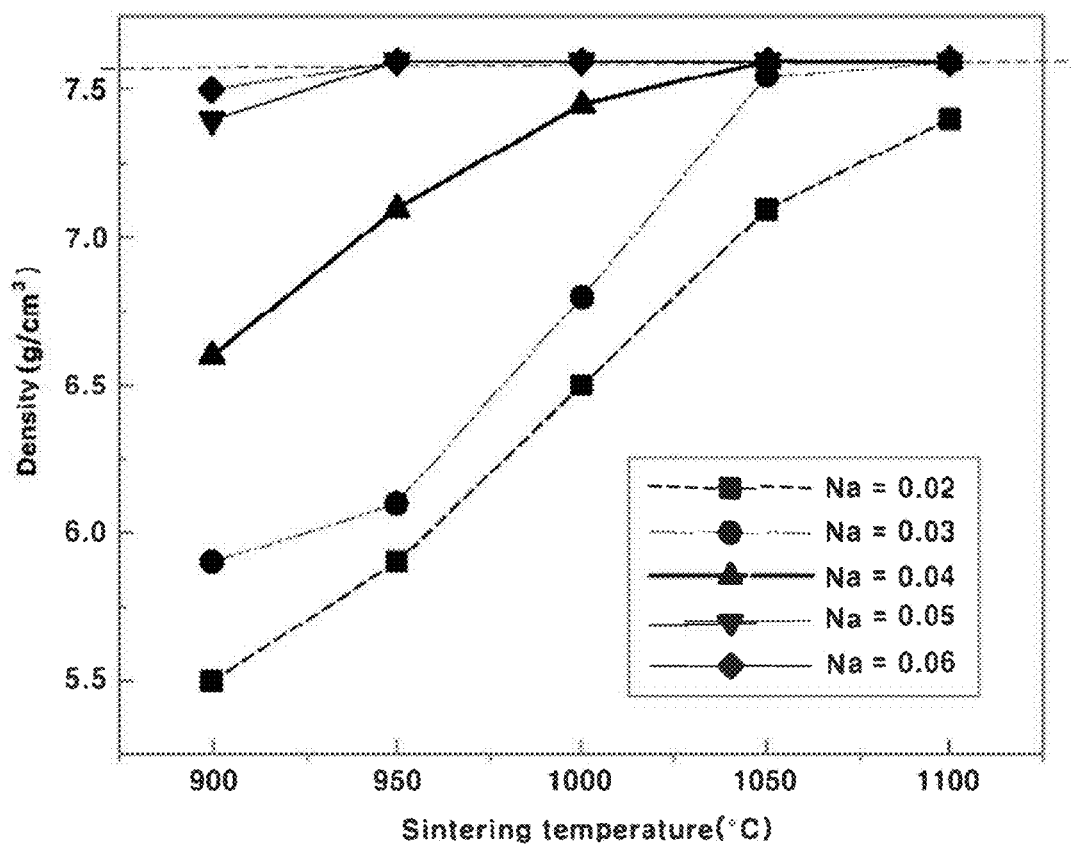
FIG. 4 shows change in sintering temperature and the density of a dielectric according to change in the content of sodium in the additive.

The dielectric constants of the dielectrics manufactured in example 1 to 3 were measured and are shown in FIGS. 2 and 3. Change in density according to change in sintering temperature of the dielectrics manufactured in Comparative Examples 2 to 6 were measured and are shown in FIG. 4.

Referring to each of these, it can be seen that the highest dielectric constant is observed when the potassium content (e.g., a molar ratio) is 0.01 to 0.03, and in particular, when the potassium content is 0.02, the dielectric constant is 900 or higher. In addition, when the PE curve is measured (as in FIG. 3), it can be confirmed that at 0.02, the dielectric constant is high, and the P (polarization) value is also high. In the case of sodium (FIG. 4), it can be seen that when the sintering temperature is 950° C., the density of the dielectric decreases as the sodium content decreases, and when the sodium content becomes 0.06 or more, the density is relatively high even at temperatures of 950° C. or lower.

What is claimed is:

1. A method of manufacturing a dielectric for a capacitor, the method comprising:
   mixing precursors of a dielectric to prepare a precursor mixture;
   calcining the precursor mixture to produce a calcined product;
   pressing the calcined product to produce a molded product;
   sintering the molded product to obtain a sintered product; and
   adding an additive to the calcined product after the calcining,
   wherein the additive comprises sodium and potassium and
   wherein the additive comprises sodium and potassium in a weight ratio in a range of 4:1 to 4.5:0.5.

2. The method of claim 1, wherein the precursors comprise: lead oxide (PbO), lanthanum oxide ($La_2O_5$), zirconium oxide ($ZrO_2$), and titanium oxide ($TiO_2$).

3. The method of claim 2, wherein the precursors comprise: 50 to 65 wt % of lead oxide (PbO), 4 to 8 wt % of lanthanum oxide ($La_2O_5$), 25 to 40 wt % of zirconium oxide ($ZrO_2$), and 2 to 6 wt % of titanium oxide ($TiO_2$).

4. The method of claim 1, wherein the calcining is carried out for 2 to 5 hours at 700° C. to 900° C.

5. The method of claim 1, wherein the sintering is carried out for 2 to 5 hours at 900° C. to 1000° C.

6. The method of claim 1, wherein the additive is added in an amount of 0.5 to 1.5 parts by weight per 100 parts by weight of the calcined product.

7. The method of claim 1, wherein the additive is a compound comprising sodium carbonate ($Na_2CO_3$) and potassium carbonate ($K_2CO_3$).

8. The method of claim 1, wherein the method further comprises drying at a temperature in a range of 80° C. to 120° C. after the calcining or the adding of the additive.

9. The method of claim 1, wherein the method further comprises mixing of the calcined product, a binder, and a solvent and granulating the resulting mixture after the adding of the additive.

* * * * *